US011840331B2

(12) United States Patent
 Gartelmann

(10) Patent No.: US 11,840,331 B2
(45) Date of Patent: Dec. 12, 2023

(54) WING FOR AN AIRCRAFT WITH A DEPLOYABLE LEADING EDGE HIGH LIFT ASSEMBLY

(71) Applicant: Airbus Operations GmbH, Hamburg (DE)

(72) Inventor: Rainer Gartelmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/695,973

(22) Filed: Mar. 16, 2022

(65) Prior Publication Data

US 2022/0306277 A1    Sep. 29, 2022

(30) Foreign Application Priority Data

Mar. 23, 2021  (DE) .......................... 102021107278.6

(51) Int. Cl.
 *B64C 3/28*   (2006.01)
 *B64C 3/26*   (2006.01)
 (Continued)

(52) U.S. Cl.
 CPC .................. *B64C 3/28* (2013.01); *B64C 3/26* (2013.01); *B64C 9/02* (2013.01); *B64C 9/04* (2013.01); *B64C 13/30* (2013.01)

(58) Field of Classification Search
 CPC .... B64C 9/02; B64C 9/24; B64C 7/00; B64C 3/48; B64C 2003/445
 See application file for complete search history.

(56) References Cited

U.S. PATENT DOCUMENTS 2,763,448 A * 9/1956 Davie, Jr. ................. B64C 3/48
                                                    244/214
3,179,357 A * 4/1965 Lyon ........................ B64C 3/48
                                                    244/219

(Continued)

FOREIGN PATENT DOCUMENTS

DE          1506317 A     7/1969
DE       69830717 T2     6/2006

(Continued)

OTHER PUBLICATIONS

European Search Report from corresponding European Patent Application No. 22161877 dated Jul. 27, 2022.
German Search Report; priority document.

*Primary Examiner* — Brady W Frazier
(74) *Attorney, Agent, or Firm* — Greer, Burns & Crain, Ltd.

(57) ABSTRACT

A wing for an aircraft, including a main wing, and a leading edge high lift assembly including a high lift body, and a connection assembly connecting the high lift body to the main wing such that the high lift body is movable relative to the main wing between a stowed position and a deployed position. The connection assembly includes at least one rotation element mounted to the high lift body and mounted to the main wing rotatably about an axis of rotation. The high lift body includes a rigid portion and a flexible skin portion. The rigid portion is mounted to the rotation element. The flexible skin portion is connected to a leading edge portion of an upper skin panel of the main wing and is connected to the rigid portion of the high lift body The flexible skin portion is configured to be deformed between a stowed deformation state and a deployed deformation state, when the high lift body is moved between the stowed position and the deployed position.

19 Claims, 4 Drawing Sheets

(51) Int. Cl.
*B64C 9/02* (2006.01)
*B64C 9/04* (2006.01)
*B64C 13/30* (2006.01)

(56) References Cited

U.S. PATENT DOCUMENTS

| | | | |
|---|---|---|---|
| 3,332,383 A | | 7/1967 | Wright |
| 3,716,209 A | * | 2/1973 | Pierce ................... B64C 3/48 |
| | | | 244/123.1 |
| 3,941,334 A | | 3/1976 | Cole |
| 4,171,787 A | | 10/1979 | Zapel |
| 4,553,722 A | | 11/1985 | Cole |
| 4,585,192 A | * | 4/1986 | Clifford-Jones .......... B64C 9/24 |
| | | | 244/210 |
| 4,706,913 A | * | 11/1987 | Cole ....................... B64C 3/48 |
| | | | 244/214 |
| 6,241,195 B1 | | 6/2001 | Wagner, III |
| 6,796,534 B2 | * | 9/2004 | Beyer ...................... B64C 3/48 |
| | | | 244/214 |
| 9,598,167 B2 | | 3/2017 | Grip et al. |
| 9,896,188 B1 | | 2/2018 | Joo |
| 11,254,414 B2 | * | 2/2022 | Shmilovich ............ B64C 13/30 |
| 2015/0251747 A1 | | 9/2015 | Roe et al. |
| 2016/0185443 A1 | | 6/2016 | Rawdon et al. |

FOREIGN PATENT DOCUMENTS

| | | |
|---|---|---|
| EP | 2915741 A1 | 9/2015 |
| WO | 8402691 A1 | 7/1984 |

\* cited by examiner

WING FOR AN AIRCRAFT WITH A DEPLOYABLE LEADING EDGE HIGH LIFT ASSEMBLY

CROSS-REFERENCES TO RELATED APPLICATIONS

This application claims the benefit of the German patent application No. 102021107278.6 filed on Mar. 23, 2021, the entire disclosures of which are incorporated herein by way of reference.

FIELD OF THE INVENTION

The present invention relates to a wing for an aircraft. Further aspects of the invention relate to a leading edge high lift assembly for such a wing as well as an aircraft comprising such a leading edge high lift assembly and/or such a wing.

BACKGROUND OF THE INVENTION

The wing comprises a main wing and a leading edge high lift assembly movable relative to the main wing to increase lift of the wing. The leading edge high lift assembly comprises a high lift body and a connection assembly. The high lift body is preferably a droop high lift body referred to as droop nose, droop leading edge, droop flap or slat, in particular sealed slat. The connection assembly is configured for connecting the high lift body to the main wing, in particular to the leading edge of the main wing, in such a way that the high lift body is movable relative to the main wing between a stowed position and a deployed position. The stowed position relates to a position where the wing profile has a lower curvature and might also be referred to as straight position, normal position, cruise position or retracted position, while the deployed position relates to a position where the wing profile has a higher curvature and might also be referred to as drooped position, landing position, on-ground position or extended position.

The connection assembly comprises at least one rotation element, such as a rotation rod or a part of the high lift body structure, that is mounted to the high lift body and that is mounted to the main wing rotatably about an axis of rotation. The rotation element is mounted to the high lift body directly or indirectly and in a fixed or rotatable manner, preferably in a fixed, non-rotatable manner, e.g., by being bolted to a rib of the high lift body or by a hinge between the end of the rotation element and the high lift body and additionally by a fixing link that is hinged to the rotation element and that is hinged to the high lift body spaced apart from the rotation element, so that a relative rotation of the high lift body and the rotation element is prevented. The axis of rotation preferably extends in parallel to the span direction and/or in parallel to the extension of leading edge along the wing, so that the high lift body is preferably rotated about the axis of rotation when moved between the stowed position and the deployed position.

The main wing comprises an upper skin panel for contact with an ambient flow on an upper side of the main wing, and a lower skin panel for contact with the ambient flow on a lower side of the main wing. The upper skin panel has a leading edge portion in the area of a leading edge of the main wing and facing the high lift body. The upper skin panel and the lower skin panel might be joined at the leading edge of the main wing, or might have an open end at the leading edge of the main wing, where they might be connected or supported against each other via a front spar.

The high lift body comprises a rigid portion and a flexible skin portion configured for contact with the ambient flow. The rigid portion is mounted, preferably fixedly mounted, to the rotation element. The flexible skin portion is connected, preferably fixedly and directly connected, in particular directly attached or integrally formed, to the leading edge portion of the upper skin panel and is connected, preferably fixedly and directly connected, in particular directly attached or integrally formed, to the rigid portion of the high lift body, preferably in the area of a leading edge of the high lift body. The flexible skin portion is configured to be deformed, preferably elastically deformed, between a stowed deformation state and a deployed deformation state, when the high lift body is moved between the stowed position and the deployed position, so that the flexible skin portion is in the stowed deformation state when the high lift body is in the stowed position and the flexible skin portion is in the deployed deformation state when the high lift body is in the deployed position.

Similar wings are known in the art. By increasing the curvature of the wing profile when the high lift body is moved to the deployed position, lift of the related aircraft can be increased, in particular to allow approach and landing with lower speed and on shorter runways. High lift assemblies with a drooping, downward rotating high lift body that is sealed to the leading edge portion of the upper skin panel, such as droop nose assemblies, relate to simple and effective high lift devices. However, form-stability of the high lift body and specifically of the flexible skin portion is important, in particular during cruise of an associated aircraft when high air loads act on the high lift body. To achieve form-stability it is known to increase the thickness of the flexible skin portion or to support the flexible skin portion from the inside, e.g., by a number of links. This, however, increases weight and complexity of the leading edge high lift assembly.

SUMMARY OF THE INVENTION

Therefore, an object of the present invention is to provide a simple and lightweight wing with a form-stable high lift body.

This object is achieved in that in the stowed deformation state the flexible skin portion is pre-stressed so that it comprises a predefined stress, in particular internal stress. By pre-stressing the flexible skin portion in the stowed deformation state the form-stability of the flexible skin portion increases drastically even under the high air loads during cruise. At the same time, the thickness of the flexible skin portion can be reduced and the flexible skin portion does not need to be supported between the rigid portion of the high lift body and the leading edge portion of the upper skin panel of the main wing, thereby reducing weight and complexity of the wing.

According to a preferred embodiment, in the stowed deformation state the flexible skin portion is pre-stressed in a chord direction so that it comprises a predefined tensile stress in the chord direction. The tensile stress results in a good form-stability of the flexible skin portion. Alternatively, the flexible skin portion might also be pre-stressed by bending about the span direction so that it comprises a predefined bending stress in the stowed deformation state. In particular, the flexible skin portion might also be pre-stressed by bending in the stowed deformation state in such a way that the flexible skin portion is relaxed, i.e., the bending stress is removed, when it is in the deployed deformation state.

According to a further preferred embodiment, in the deployed deformation state the flexible skin portion is relaxed, i.e., in a relaxed state, so that the predefined stress is removed. In the deployed deformation state form-stability is achieved by the higher curvature of the flexible skin portion compared to the stowed deformation state. Further, the high lift body is usually in the deployed position during take-off and landing when the air loads are considerably lower as during cruise. However, it is also possible that the predefined stress is only partly removed from the flexible skin portion in the deployed position, so that a residual stress remains.

According to a further preferred embodiment, the axis of rotation of the rotation element extends outside an outer mold line of the wing, i.e., outside a cross section across the span direction of the wing, preferably above the flexible skin portion, preferably near the attachment of the flexible skin portion at the upper skin panel of the main wing. Such a position of the axis of rotation can be achieved by a respective design or configuration of the connection assembly. By such a position of the axis of rotation it can be avoided that the flexible skin portion is stretched when the high lift body is moved into the deployed position. The features of this embodiment, i.e., the axis of rotation of the rotation element extending outside an outer mold line of the wing, also forms an independent aspect of the present invention independent from the features relating to the flexible skin portion being pre-stressed in the stowed deformation state.

According to a further preferred embodiment, the leading edge high lift assembly comprises a pre-stressing device for introducing and preferably also removing the predefined stress into the flexible skin portion. The pre-stressing device can have different forms but preferably includes a mechanism mounted between the main wing and the rotation element or the rigid portion of the high lift body. In such a way, the predefined stress can be easily and reliably introduced into the flexible skin portion.

In particular, it is preferred that the pre-stressing device comprises a linkage that is rotatably mounted to the rotation element and that is rotatably mounted to the main wing. By such a linkage the predefined stress can be easily and reliably introduced into the flexible skin portion.

It is further preferred that the linkage is movable between an extended state and a retracted state. Preferably, the linkage is in the extended state when the flexible skin portion is in the stowed deformation state, and the linkage is in the retracted state when the flexible skin portion is in the deployed deformation state. In such a way, the flexible skin portion can be pre-stressed by bringing the linkage into the extended state.

It is also preferred that the linkage comprises a first link rotatably and preferably directly mounted to the rotation element, preferably by its one end, and a second link rotatably mounted to the other end of the first link by its one end and rotatably mounted to the main wing, preferably by its other end. Preferably, in the extended state of the linkage the first link and the second link enclose a larger angle, while in the retracted state of the linkage the first link and the second link enclose a smaller, i.e., more acute, angle. Preferably, the axes of rotation of the first and second links extend in parallel to the span direction and/or to the axis of rotation about which the rotation element rotates relative to the main wing. In such a way, a very efficient linkage is provided for introducing the predefined stress.

In particular, it is preferred that the first link is mounted to the second link by a rotatable joint. The pre-stressing device further comprises a guide element mounted to the main wing, preferably in the form of a guide roller mounted to the main wing rotatably about a fixed rotation axis, preferably parallel to the span direction and/or to the axes of rotation of the first and second links. The guide element guides the rotatable joint when the linkage is moved from the retracted state to the extended state of the linkage and preferably supports the rotatably joint in the extended state in a predetermined position. Preferably, the first link slides along the guide element, when the linkage is moved from the retracted state to the extended state, until the rotatable joint meets the guide element, and thereby straightens and extends the linkage. In such a way, a very efficient pre-stressing device is formed.

Further, it is preferred that the second link is mounted to the main wing via a third link that is rotatably and preferably directly mounted to the main wing, preferably by one end, and that is rotatably mounted to the second link, preferably by its other end. Preferably, the axis of rotation about which the third link is mounted rotatably to the fixed wing is fixed relative to the main wing and/or extends in parallel to the span direction and/or to the axes of rotation of the first and second links. The third link might not have an elongate form but might have the form of, e.g., a plate. This relates to a very efficient linkage.

In particular, it is preferred that the third link comprises a linear guide, such as a linear displacement bearing, a sliding bearing or a sliding restraint. The rotation element comprises or is formed as a rod that is guided in a linearly displaceable manner by the linear guide, preferably received within the linear guide in a linearly displaceable manner, so that the rod can be linearly moved along or within the linear guide when the linkage is moved between the retracted state and the extended state. In particular, movement of the linkage between the retracted state and the extended state causes a linear movement of the rod along or within the linear guide. Preferably, the direction of linear movement of the rod along or within the linear guide is perpendicular to the axis about which the third link rotates. The third link and linear guide allow the rotation element to linearly move which is results in the introduction or removal of the predefined stress.

According to a preferred embodiment, the pre-stressing device comprises a pre-stress adjuster for adjusting, in particular calibrating, the amount of predefined stress introduced into the flexible skin portion by the pre-stressing device in the stowed deformation state. This allows the pre-stressing device to be calibrated by the pre-stress adjuster.

In particular, it is preferred that the pre-stress adjuster is formed by the first link being length-adjustable, preferably by a length-adjustment screw, such as a tensioning screw, bottle screw, or turnbuckle, preferably being in threaded engagement with the two opposite ends of the first link and being rotatable about the longitudinal axis of the first link for length adjustment. By adjusting the length of the first link the predefined stress in the flexible skin portion can be adjusted in a simple and efficient manner.

According to a further preferred embodiment, the leading edge high lift assembly comprises an actuator for moving the high lift body between the stowed position and the deployed position. The actuator might be a geared rotary actuator that is driven by a rotating drive shaft extending along the span of the wing. The actuator directly or indirectly causes the linkage to move between the retracted state and the extended state and thus causes the pre-stressing device to introduce or remove the predefined stress.

In particular, it is preferred that the actuator is mounted, preferably fixedly mounted, to the main wing, preferably to a chordwise mounting rib connected to a front spar of the main wing. Preferably, the actuator has a rotatable drive arm driving the high lift body preferably via a drive link that is rotatably mounted to the drive arm, preferably by its one end, and that is rotatably mounted to the rigid portion of the high lift body, preferably by its other end. In such a way, a simple, reliable and efficient actuator is formed.

According to a further preferred embodiment, the leading edge high lift assembly comprises a further connection assembly spaced from the connection assembly in the span direction and preferably formed as the connection assembly. Preferably at least two spaced connection assemblies are provided to carry each high lift body. Each connection assembly might also comprise more than one rotation element. In such a way, a stable hold and movement of the high lift body is achieved.

A further aspect of the present invention relates to a wing for an aircraft. The wing comprises a main wing and a leading edge high lift assembly. The leading edge high lift assembly comprises a high lift body and a connection assembly connecting the high lift body to the main wing in such a way that the high lift body is movable relative to the main wing between a stowed position and a deployed position. The connection assembly comprises at least one rotation element that is mounted to the high lift body and that is mounted to the main wing rotatably about an axis of rotation. The main wing comprises an upper skin panel and a lower skin panel, wherein the upper skin panel has a leading edge portion. The high lift body comprises a rigid portion and a flexible skin portion. The rigid portion is mounted to the rotation element. The flexible skin portion is connected to the leading edge portion of the upper skin panel and is connected to the rigid portion of the high lift body. The flexible skin portion is configured to be deformed between a stowed deformation state and a deployed deformation state, when the high lift body is moved between the stowed position and the deployed position. The axis of rotation of the rotation element extends outside an outer mold line of the wing. The features, embodiments and effects described above in connection with the wing according to the first aspect apply vis-a-vis also to the wing according to present second aspect of the invention.

A further aspect of the invention relates to a leading edge high lift assembly for the wing according to any of the afore-described embodiments and aspects. The leading edge high lift assembly comprises a high lift body and a connection assembly for connecting the high lift body to a main wing in such a way that the high lift body is movable relative to the main wing between a stowed position and a deployed position. The connection assembly comprises a rotation element that is mounted to the high lift body and that is configured to be mounted to the main wing rotatably about an axis of rotation. The high lift body comprises a rigid portion and a flexible skin portion. The rigid portion is mounted to the rotation element. The flexible skin portion is configured to be connected to a leading edge portion of an upper skin panel of the main wing and is connected to the rigid portion of the high lift body. The flexible skin portion is configured to be deformed between a stowed deformation state and a deployed deformation state, when the high lift body is moved between the stowed position and the deployed position. In the stowed deformation state the flexible skin portion is configured to be pre-stressed so that it comprises a predefined stress. Alternatively, the leading edge high lift assembly is configured such that the axis of rotation of the rotation element extends outside an outer mold line of the wing, when the wing is in the assembled state. Features and effects described above in connection with the wing apply vis-a-vis also to the leading edge high lift assembly.

A further aspect of the invention relates to an aircraft comprising the wing according to any of the afore-described embodiments and/or comprising the leading edge high lift assembly according to any of the afore described embodiments. Features and effects described above in connection with the wing and in connection with the leading edge high lift assembly apply vis-a-vis also to the aircraft.

BRIEF DESCRIPTION OF THE DRAWINGS

A preferred embodiment of the present invention is explained hereinafter in more detail by means of a drawing.

DETAILED DESCRIPTION OF THE PREFERRED EMBODIMENTS

Figure 1:
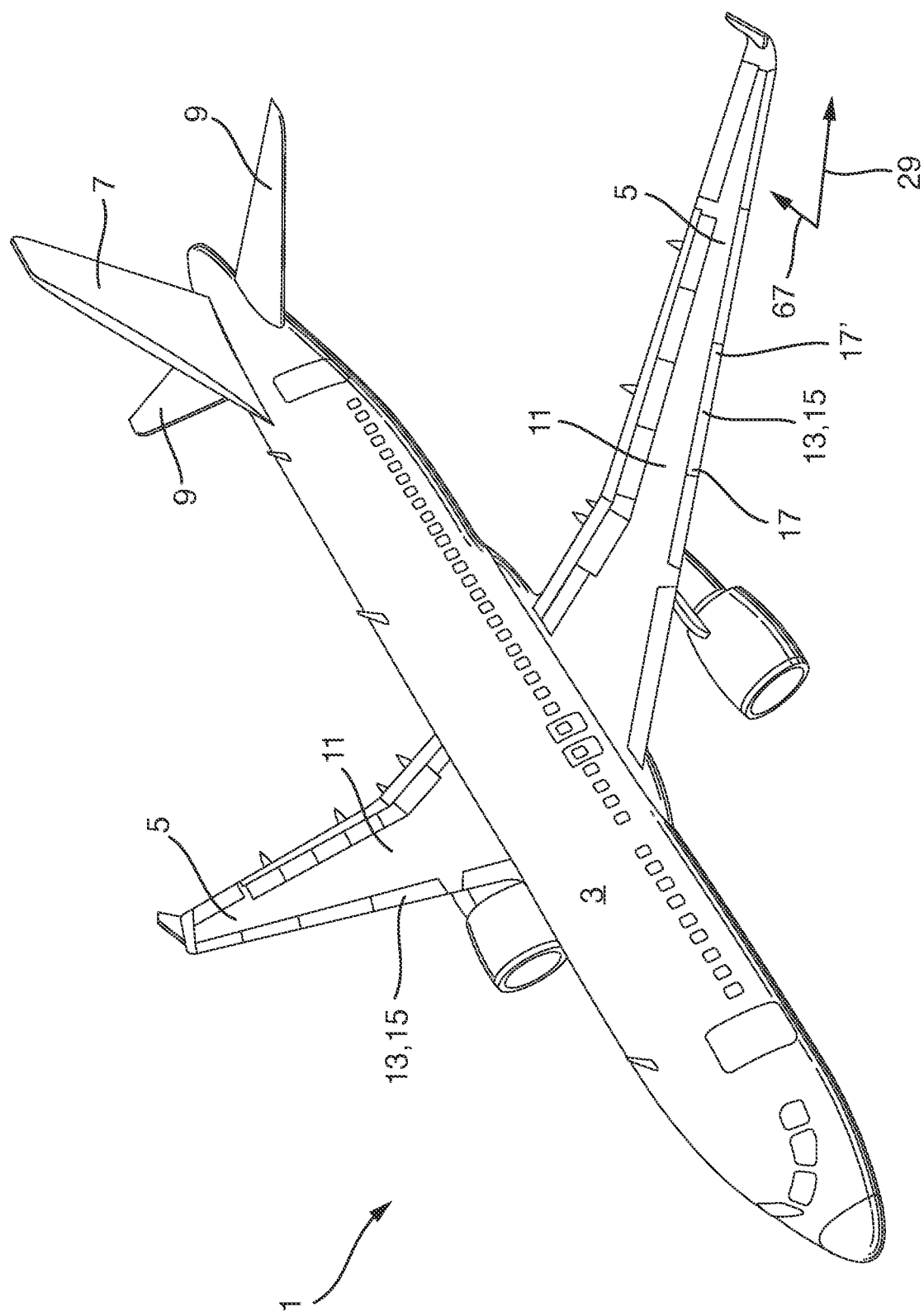
FIG. 1 is a perspective view of an aircraft according to the invention.

In FIG. 1 an embodiment of an aircraft 1 according to the present invention is illustrated. The aircraft 1 comprises a fuselage 3, wings 5, a vertical tail plane 7 and a horizontal tail plane 9. FIGS. 2 to 9 show in more detail several embodiments of the wings 5.

Figure 2:
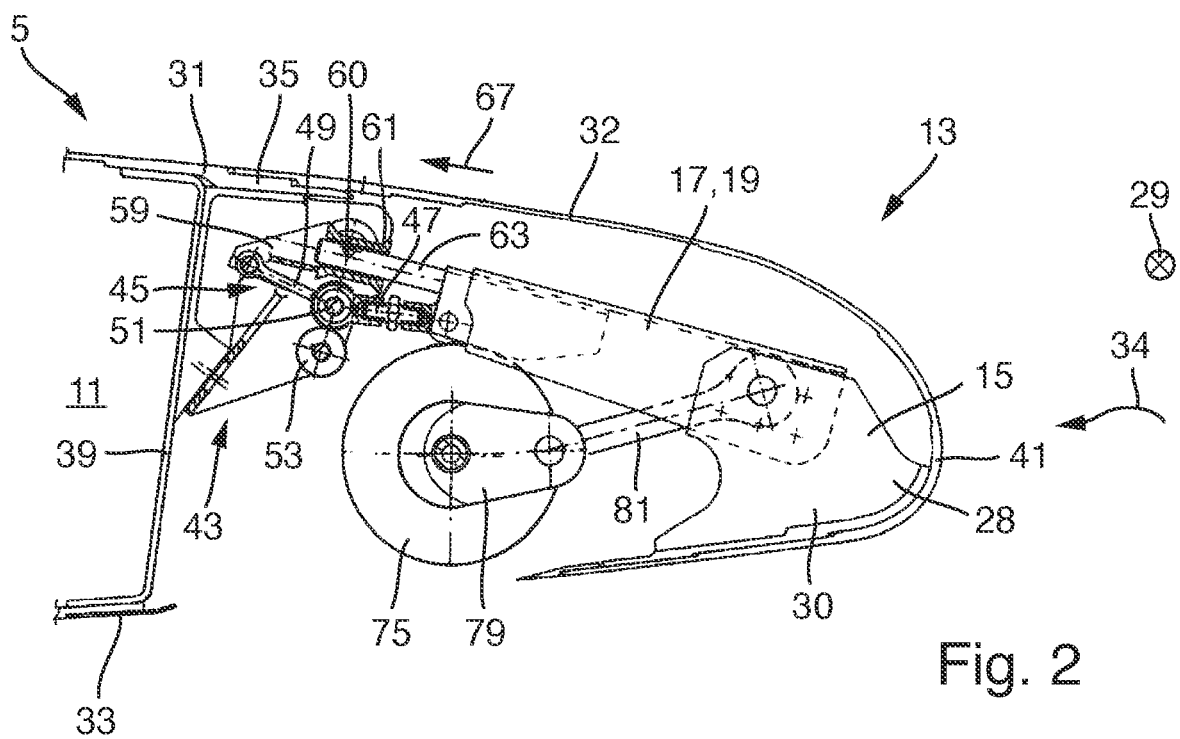
FIG. 2 is a cross-sectional view across the span direction of a wing according to the invention with a high lift body in the stowed position.
Figure 3:
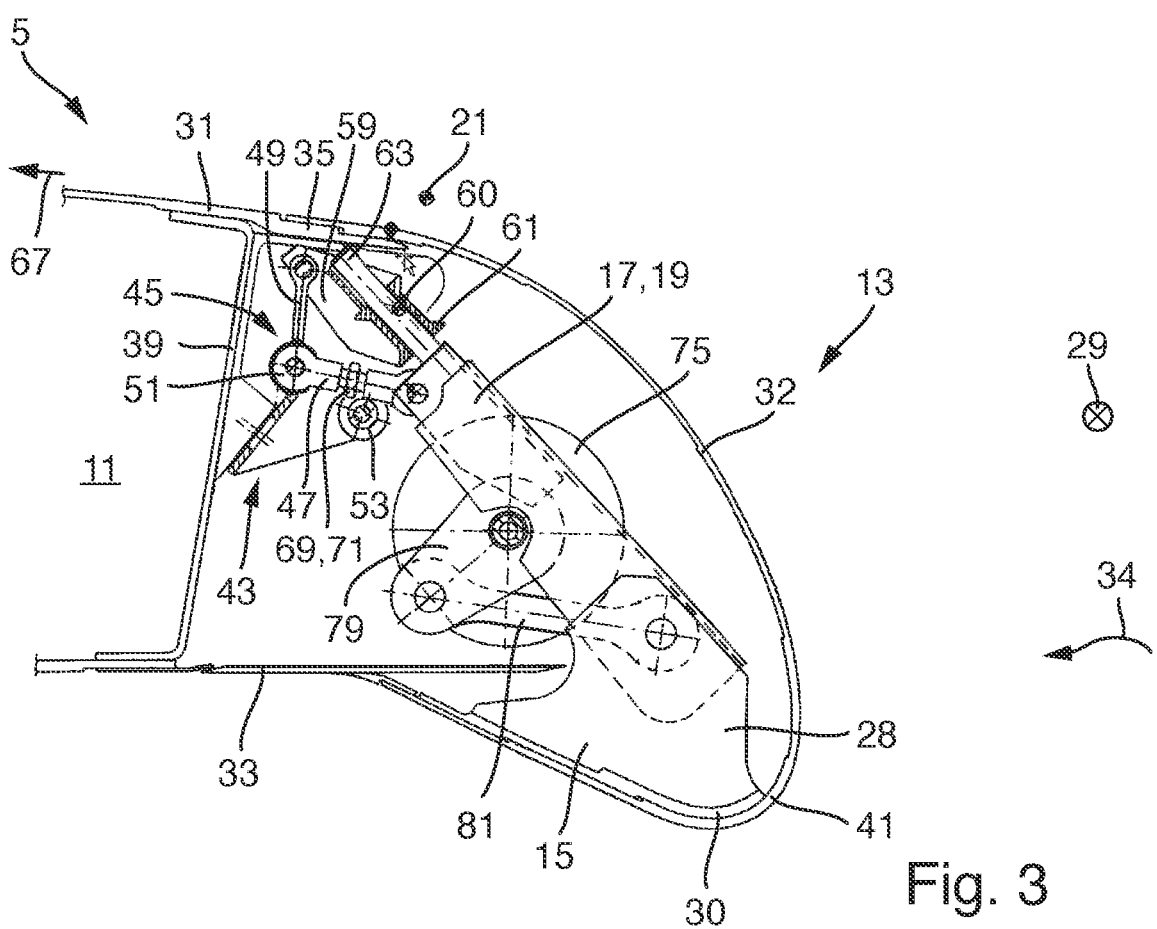
FIG. 3 is the wing shown in FIG. 2 with the high lift body in the deployed position.

FIGS. 2 and 3 show an embodiment of the wing 5 according to the invention. The wing 5 comprises a main wing 11 and a leading edge high lift assembly 13 movable relative to the main wing 11 to increase lift of the wing 5. The leading edge high lift assembly 13 comprises a high lift body 15 and a connection assembly 17. The high lift body 15 is a droop high lift body also referred to as droop nose, droop leading edge, droop flap or slat, in particular, sealed slat. The connection assembly 17 is configured for connecting the high lift body 15 to the leading edge of the main wing 11 in such a way that the high lift body 15 is movable relative to the main wing 11 between a stowed position and a deployed position. The stowed position relates to a position where the wing profile has a lower curvature, while the deployed position relates to a position where the wing profile has a higher curvature.

The connection assembly 17 comprises at least one rotation element 19 that is mounted to the high lift body 15 and that is mounted to the main wing 11 rotatably about an axis of rotation 21. The rotation element 19 is mounted to the high lift body 15 in a fixed, non-rotatable manner by being bolted to a rigid rib 28 of the high lift body 15. The axis of rotation 21 extends in parallel to a span direction 29 and in parallel to the extension of leading edge along the wing 5, so that the high lift body 15 is rotated about the axis of rotation 21 when moved between the stowed position and the deployed position. The axis of rotation 21 of the rotation element 19 extends outside an outer mold line of the wing 5 above the high lift body 15.

The main wing 11 comprises an upper skin panel 31 for contact with an ambient flow 34 on an upper side of the main wing 11, and a lower skin panel 33 for contact with the ambient flow 34 on a lower side of the main wing 11. The upper skin panel 31 has a leading edge portion 35 in the area of a leading edge of the main wing 11 and facing the high lift body 15. The upper skin panel 31 and the lower skin panel 33 are connected and supported against each other via a front spar 39.

The high lift body 15 comprises a rigid portion 30 and a flexible skin portion 32 configured for contact with the ambient flow 34. The rigid portion 30 is fixedly mounted to the rotation element 19. The flexible skin portion 32 is fixedly and directly attached to the leading edge portion 35 of the upper skin panel 31 and is fixedly and directly attached to the rigid portion 30 of the high lift body 15 in the area of a leading edge 41 of the high lift body 15. The flexible skin portion 32 is configured to be elastically deformed between a stowed deformation state and a deployed deformation state, when the high lift body 15 is moved between the stowed position and the deployed position, so that the flexible skin portion 32 is in the stowed deformation state when the high lift body 15 is in the stowed position and the flexible skin portion 32 is in the deployed deformation state when the high lift body 15 is in the deployed position.

In the stowed deformation state the flexible skin portion 32 is pre-stressed in a chord direction 67 so that it comprises a predefined stress in the form of tensile stress. In the deployed deformation state the flexible skin portion 32 is relaxed so that the predefined stress is removed.

Figure 4:
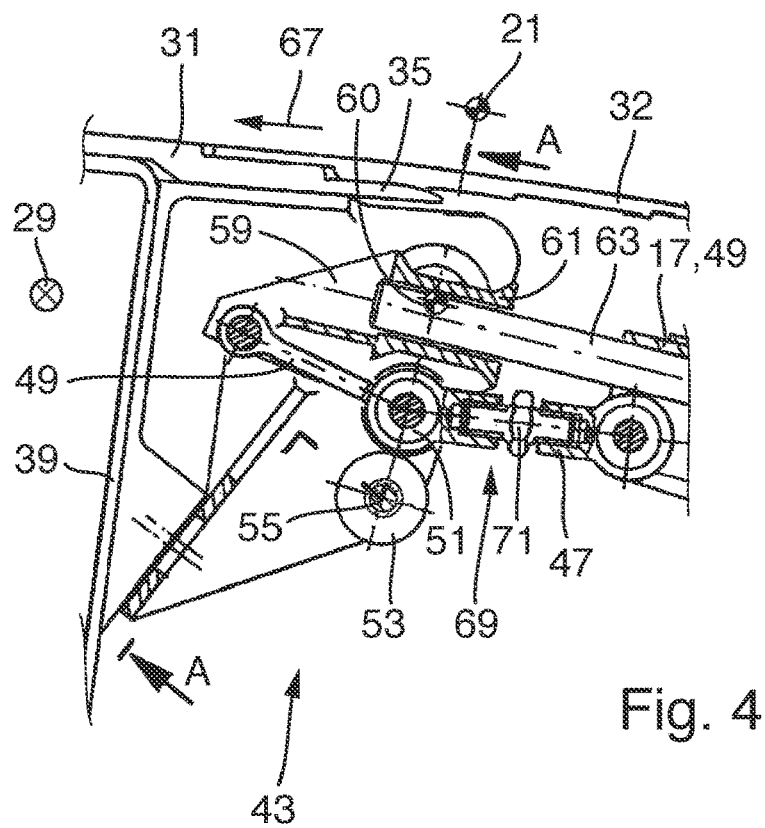
FIG. 4 is a detailed view of the pre-stressing device of the wing shown in FIG. 2.
Figure 5:
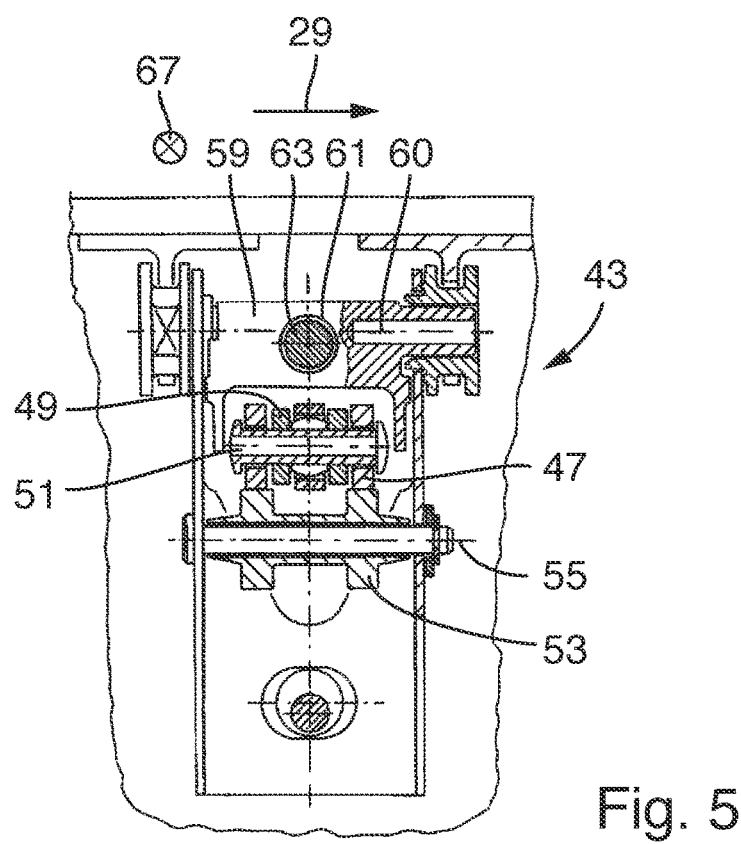
FIG. 5 is a sectional view along section A-A in FIG. 4.

As shown in more detail in FIGS. 4 and 5, the leading edge high lift assembly 13 comprises a pre-stressing device 43 for introducing and removing the predefined stress into the flexible skin portion 32. The pre-stressing device 43 comprises a linkage 45 that is rotatably mounted to the rotation element 19 and that is rotatably mounted to the main wing 11. The linkage 45 is movable between an extended state and a retracted state. The linkage 45 is in the extended state when the flexible skin portion 32 is in the stowed deformation state, and the linkage 45 is in the retracted state when the flexible skin portion 32 is in the deployed deformation state.

The linkage 45 comprises a first link 47 rotatably and directly mounted to the rotation element 19 and a second link 49 rotatably and directly mounted to the first link 47 and rotatably mounted to the main wing 11. In the extended state of the linkage 45 the first link 47 and the second link 49 enclose a larger angle, while in the retracted state of the linkage 45 the first link 47 and the second link 49 enclose a smaller angle.

The first link 47 is mounted to the second link 49 by a rotatable joint 51. The pre-stressing device 43 further comprises a guide element 53 in the form of a guide roller mounted to the main wing 11 directly and rotatably about a fixed rotation axis 55. The guide element 53 guides the rotatable joint 51 when the linkage 45 is moved from the retracted state to the extended state of the linkage 45 and supports the rotatable joint 51 in the extended state in a predetermined position. The first link 47 slides along the guide element 53, when the linkage 45 is moved from the retracted state to the extended state, until the rotatable joint 51 meets the guide element 53, and thereby straightens and extends the linkage 45.

The second link 49 is mounted to the main wing 11 via a third link 59 that is rotatably and directly mounted to the main wing 11 and that is rotatably and directly mounted to the second link 49. The axis of rotation 60 about which the third link 59 is mounted rotatably to the main wing is fixed relative to the main wing. The third link 59 comprises a linear guide 61. The rotation element 19 comprises a rod 63 that is received and guided in a linearly displaceable manner within the linear guide 61, so that the rod 63 can be linearly moved within the linear guide 61 when the linkage 45 is moved between the retracted state and the extended state. The direction of linear movement of the rod 63 within the linear guide 61 is perpendicular to the axis about which the third link 59 rotates.

As shown in FIG. 4, the pre-stressing device 43 comprises a pre-stress adjuster 69 for adjusting and calibrating the amount of predefined stress introduced into the flexible skin portion 32 by the pre-stressing device 69 in the stowed deformation state. The pre-stress adjuster 69 is formed by the first link 47 being length-adjustable by a length-adjustment screw 71 being in threaded engagement with the two opposite ends of the first link 47 and being rotatable about the longitudinal axis of the first link 47 for length adjustment.

Figure 6:
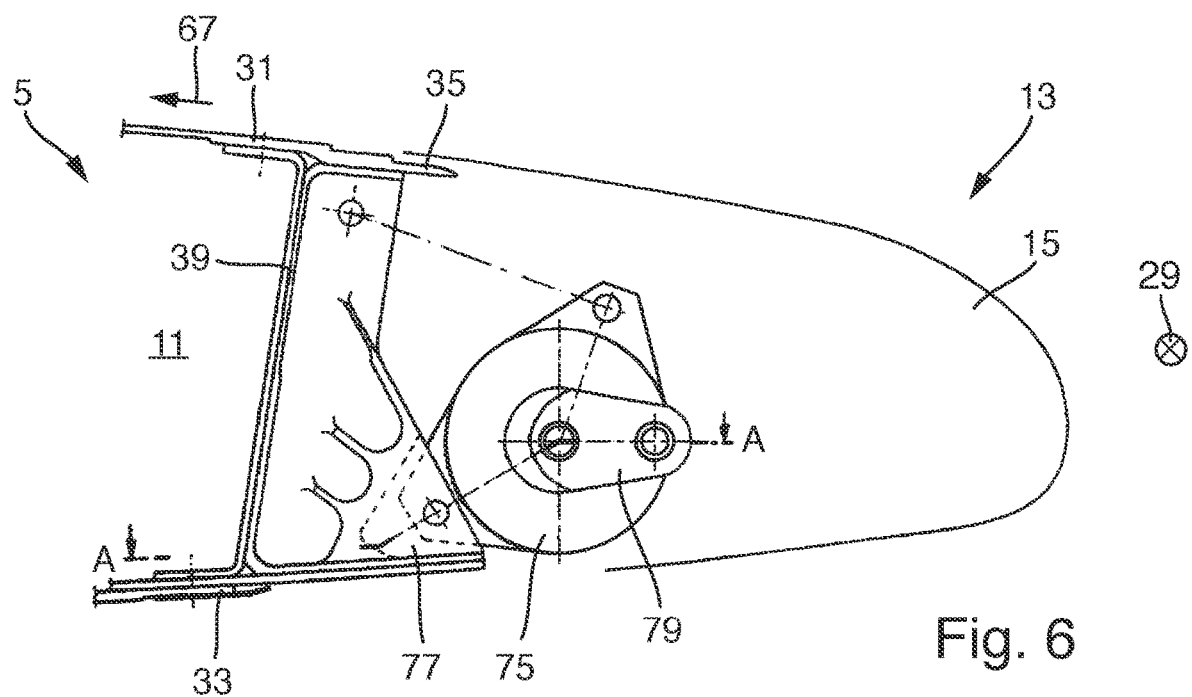
FIG. 6 is the wing of FIG. 2 showing details of the mounting of the actuator to the front spar.
Figure 7:
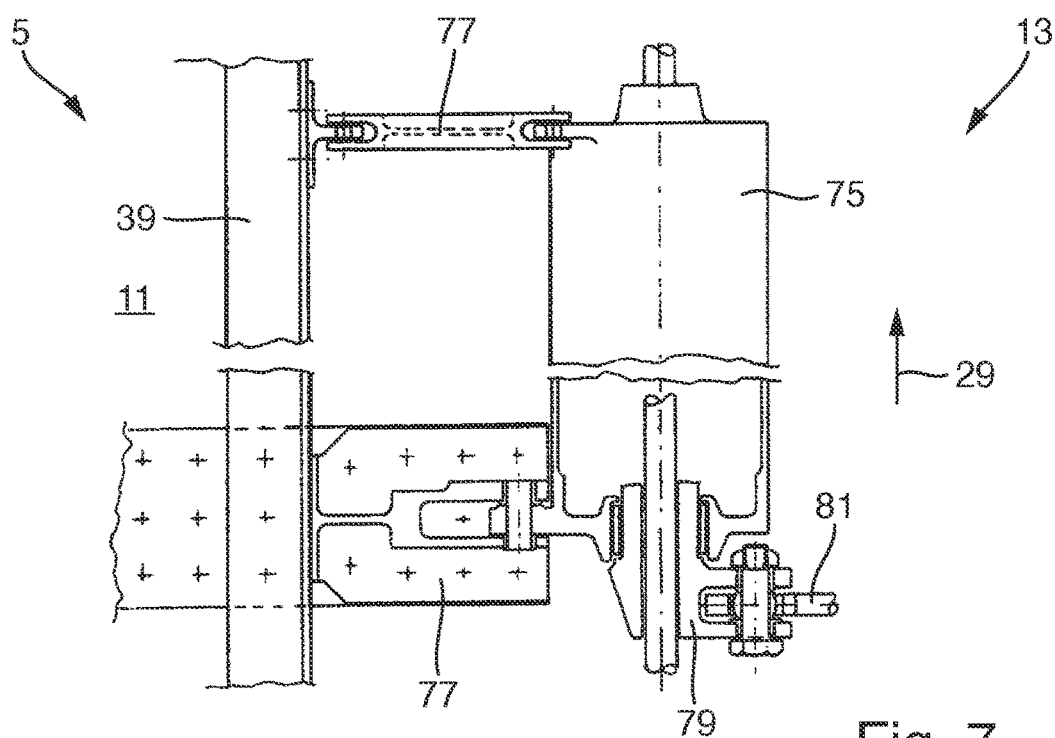
FIG. 7 is a sectional view along section A-A in FIG. 6.

The leading edge high lift assembly 13 further comprises an actuator 75 for moving the high lift body 15 between the stowed position and the deployed position, as shown in FIGS. 2, 3, 6 and 7. The actuator 75 is fixedly mounted to a chordwise mounting rib 77 connected to the front spar 39 of the main wing 11, as shown in FIGS. 6 and 7. The actuator 75 has a rotatable drive arm 79 driving the high lift body 15 via a drive link 81 that is rotatably mounted to the drive arm 79 and that is rotatably mounted to the rigid portion 30 of the high lift body 15.

As shown in FIG. 1, the leading edge high lift assembly 13 comprises a further connection assembly 17' spaced from the connection assembly 17 in the span direction 29 and preferably formed as the connection assembly 17. At least two spaced connection assemblies 17, 17' are provided to carry each high lift body 15. Each connection assembly 17, 17' might also comprise more than one rotation element 19.

By the invention as described above, a wing 5 with a very efficient leading edge high lift assembly 13 can be formed. By pre-stressing the flexible skin portion 32 in the stowed deformation state the form-stability of the flexible skin portion 32 increases drastically even under the high air loads during cruise. At the same time, the thickness of the flexible skin portion 32 can be reduced and the flexible skin portion 32 does not need to be supported between the rigid portion 30 of the high lift body 15 and the leading edge portion 35 of the upper skin panel 31 of the main wing 11, thereby reducing weight and complexity of the wing 5.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
   a main wing, and
   a leading edge high lift assembly comprising:
      a high lift body, and
      a connection assembly connecting the high lift body to the main wing such that the high lift body is movable relative to the main wing between a stowed position and a deployed position,
   wherein the connection assembly comprises at least one rotation element that is mounted to the high lift body and that is mounted to the main wing rotatably about an axis of rotation,
   wherein the main wing comprises an upper skin panel and a lower skin panel, wherein the upper skin panel has a leading edge portion,
   wherein the high lift body comprises a rigid portion and a flexible skin portion,
   wherein the rigid portion is mounted to the rotation element,
   wherein the flexible skin portion is connected to the leading edge portion of the upper skin panel and is connected to the rigid portion of the high lift body,
   wherein the flexible skin portion is configured to be deformed between a stowed deformation state and a deployed deformation state, when the high lift body is moved between the stowed position and the deployed position by an actuator, and
   wherein in the stowed deformation state the flexible skin portion is pre-stressed so that the flexible skin portion comprises a predefined stress, and
   wherein the leading edge high lift assembly comprises a pre-stressing device displaced from the actuator for introducing the predefined stress into the flexible skin portion.

2. The wing according to claim 1, wherein in the stowed deformation state the flexible skin portion is pre-stressed in a chord direction so that the flexible skin portion comprises a predefined tensile stress in the chord direction.

3. The wing according to claim 1, wherein in the deployed deformation state the flexible skin portion is relaxed so that the predefined stress is removed.

4. The wing according to claim 1, wherein the axis of rotation of the at least one rotation element is the same as an axis of rotation of the high lift body, and wherein the axis of rotation extends outside an outer mold line of the wing.

5. The wing according to claim 1, wherein the pre-stressing device comprises a linkage that is rotatably mounted to the rotation element and that is rotatably mounted to the main wing.

6. The wing according to claim 5,
   wherein the linkage is movable between an extended state and a retracted state,
   wherein the linkage is in the extended state when the flexible skin portion is in the stowed deformation state, and
   wherein the linkage is in the retracted state when the flexible skin portion is in the deployed deformation state.

7. The wing according to claim 6,
   wherein the linkage comprises a first link rotatably mounted to the rotation element, and a second link rotatably mounted to the first link and rotatably mounted to the main wing,
   wherein in the extended state of the linkage the first link and the second link enclose a larger angle, while in the retracted state of the linkage the first link and the second link enclose a smaller angle.

8. The wing according to claim 7, wherein the first link is mounted to the second link by a rotatable joint,
   wherein the pre-stressing device further comprises a guide element mounted to the main wing,
   wherein the guide element guides the rotatable joint when the linkage is moved from the retracted state to the extended state of the linkage and supports the rotatable joint in the extended state in a predetermined position.

9. The wing according to claim 7, wherein the second link is mounted to the main wing via a third link that is rotatably mounted to the main wing and that is rotatably mounted to the second link.

10. The wing according to claim 9,
    wherein the third link comprises a linear guide, and
    wherein the rotation element comprises a rod that is guided in a linearly displaceable manner by the linear guide.

11. The wing according to claim 1, wherein the pre-stressing device comprises a pre-stress adjuster for adjusting an amount of predefined stress introduced into the flexible skin portion by the pre-stressing device in the stowed deformation state.

12. The wing according to claim 11,
    wherein the pre-stressing device comprises a linkage that is rotatably mounted to the rotation element and that is rotatably mounted to the main wing,
    wherein the linkage comprises a first link rotatably mounted to the rotation element, and a second link rotatably mounted to the first link and rotatably mounted to the main wing, and
    wherein the first link is length adjustable, such that the first link forms the pre-stress adjuster.

13. The wing according to claim 1, wherein the actuator is mounted to the main wing and has a rotatable drive arm driving the high lift body via a drive link that is rotatably mounted to the drive arm and that is rotatably mounted to the rigid portion of the high lift body.

14. A wing for an aircraft, comprising:
    a main wing, and
    a leading edge high lift assembly comprising:
       a high lift body, and
       a connection assembly connecting the high lift body to the main wing such that the high lift body is movable relative to the main wing between a stowed position and a deployed position,
    wherein the connection assembly comprises at least one rotation element that is mounted to the high lift body and that is mounted to the main wing rotatably about an axis of rotation,
    wherein the main wing comprises an upper skin panel and a lower skin panel, wherein the upper skin panel has a leading edge portion,
    wherein the high lift body comprises a rigid portion and a flexible skin portion,
    wherein the rigid portion is mounted to the rotation element,
    wherein the flexible skin portion is connected to the leading edge portion of the upper skin panel and is connected to the rigid portion of the high lift body,
    wherein the flexible skin portion is configured to be deformed between a stowed deformation state and a deployed deformation state, when the high lift body is moved between the stowed position and the deployed position, and wherein the axis of rotation of the at least one rotation element is the same as an axis of rotation of the high lift body, and wherein the axis of rotation extends outside an outer mold line of the wing.

15. A leading edge high lift assembly for a wing, comprising:

a high lift body, and a connection assembly for connecting the high lift body to the main wing such that the high lift body is movable relative to the main wing between a stowed position and a deployed position, wherein the connection assembly comprises at least one rotation element that is mounted to the high lift body and that is configured to be mounted to the main wing rotatably about an axis of rotation, wherein the high lift body comprises a rigid portion and a flexible skin portion, wherein the rigid portion is mounted to the rotation element, wherein the flexible skin portion is configured to be connected to a leading edge portion of an upper skin panel of the main wing and is connected to the rigid portion of the high lift body, and wherein the flexible skin portion is configured to be deformed between a stowed deformation state and a deployed deformation state, when the high lift body is moved between the stowed position and the deployed position, wherein in the stowed deformation state the flexible skin portion is configured to be pre-stressed so that the flexible skin portion comprises a predefined stress, or wherein the leading edge high lift assembly is configured such that the axis of rotation of the rotation element extends outside an outer mold line of the wing, when the wing is in an assembled state.

16. An aircraft comprising the wing according to claim 1.

17. A wing for an aircraft, comprising:

a main wing, and a leading edge high lift assembly comprising:

a high lift body, and a connection assembly connecting the high lift body to the main wing such that the high lift body is movable relative to the main wing between a stowed position and a deployed position, wherein the connection assembly comprises at least one rotation element that is mounted to the high lift body and that is mounted to the main wing rotatably about an axis of rotation, wherein the main wing comprises an upper skin panel and a lower skin panel, wherein the upper skin panel has a leading edge portion, wherein the high lift body comprises a rigid portion and a flexible skin portion, wherein the rigid portion is mounted to the rotation element, wherein the flexible skin portion is connected to the leading edge portion of the upper skin panel and is connected to the rigid portion of the high lift body, wherein the flexible skin portion is configured to be deformed between a stowed deformation state and a deployed deformation state, when the high lift body is moved between the stowed position and the deployed position, and wherein in the stowed deformation state the flexible skin portion is pre-stressed so that the flexible skin portion comprises a predefined stress, wherein the leading edge high lift assembly comprises a pre-stressing device for introducing the predefined stress into the flexible skin portion, wherein the pre-stressing device comprises a pre-stress adjuster for adjusting an amount of predefined stress introduced into the flexible skin portion by the pre-stressing device in the stowed deformation state, wherein the pre-stressing device comprises a linkage that is rotatably mounted to the rotation element and that is rotatably mounted to the main wing, wherein the linkage comprises a first link rotatably mounted to the rotation element, and a second link rotatably mounted to the first link and rotatably mounted to the main wing, and wherein the pre-stress adjuster is formed by the first link being length-adjustable.

18. The wing according to claim 1, wherein the at least one rotation element that is mounted to the high lift body in a fixed, non-rotatable manner.

19. The wing according to claim 1, wherein the at least one rotation element that is mounted to the high lift body in a fixed, non-rotatable manner.

* * * * *